(12) United States Patent
Noborio et al.

(10) Patent No.: US 9,347,505 B2
(45) Date of Patent: May 24, 2016

(54) DISC BRAKE CALIPER AND BASE MEMBER

(71) Applicant: SHIMANO INC., Sakai (JP)

(72) Inventors: Daisuke Noborio, Sakai (JP); Tsutomu Muraoka, Sakai (JP); Osamu Kariyama, Sakai (JP); Masahiro Nakakura, Sakai (JP)

(73) Assignee: SHIMANO INC., Sakai (JP)

( * ) Notice: Subject to any disclaimer, the term of this patent is extended or adjusted under 35 U.S.C. 154(b) by 46 days.

(21) Appl. No.: 14/169,027

(22) Filed: Jan. 30, 2014

(65) Prior Publication Data

US 2015/0210345 A1    Jul. 30, 2015

(51) Int. Cl.
| | |
|---|---|
| *B62L 1/00* | (2006.01) |
| *F16D 65/00* | (2006.01) |
| *B62L 3/02* | (2006.01) |
| *B62K 19/38* | (2006.01) |
| *F16D 55/228* | (2006.01) |
| *F16D 65/18* | (2006.01) |
| *F16D 121/04* | (2012.01) |

(52) U.S. Cl.
CPC ............ *F16D 65/0056* (2013.01); *B62K 19/38* (2013.01); *B62L 3/023* (2013.01); *F16D 55/228* (2013.01); *F16D 65/0068* (2013.01); *F16D 65/0075* (2013.01); *F16D 65/18* (2013.01); *F16D 2121/04* (2013.01)

(58) Field of Classification Search
USPC .......................................... 188/26, 72.4, 73.31
See application file for complete search history.

(56) References Cited

U.S. PATENT DOCUMENTS

| | | | | |
|---|---|---|---|---|
| 6,230,849 | B1 * | 5/2001 | Lumpkin | 188/24.12 |
| 2006/0231351 | A1 * | 10/2006 | Kariyama | 188/26 |
| 2009/0200121 | A1 * | 8/2009 | Takizawa et al. | 188/72.5 |
| 2013/0048444 | A1 * | 2/2013 | Hirotomi et al. | 188/73.31 |
| 2014/0083805 | A1 * | 3/2014 | Hirotomi | 188/73.31 |
| 2015/0001012 | A1 * | 1/2015 | Noborio et al. | 188/72.4 |
| 2015/0001014 | A1 * | 1/2015 | Noborio et al. | 188/73.31 |

* cited by examiner

*Primary Examiner* — Christopher Schwartz
(74) *Attorney, Agent, or Firm* — Mori & Ward, LLP

(57) ABSTRACT

A disc brake caliper comprises a caliper main-body. The caliper main-body includes a facing surface and an attachment structure. The facing surface is configured to face a mounting portion of a bicycle frame to which the disc brake caliper is attached. A connecting member is to be attached to the attachment structure. The connecting member is configured to be connected to a fluid hose. The attachment structure is provided on the facing surface.

24 Claims, 16 Drawing Sheets

DISC BRAKE CALIPER AND BASE MEMBER

BACKGROUND OF THE INVENTION

1. Field of the Invention

The present invention relates to a disc brake caliper and a base member.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is a bicycle brake device. In particular, in recent years, bicycles have been provided with disc braking devices.

SUMMARY OF THE INVENTION

In accordance with a first aspect of the present invention, a disc brake caliper comprises a caliper main-body. The caliper main-body includes a facing surface and an attachment structure. The facing surface is configured to face a mounting portion of a bicycle frame to which the disc brake caliper is attached. A connecting member is to be attached to the attachment structure. The connecting member is configured to be connected to a fluid hose. The attachment structure is provided on the facing surface.

In accordance with a second aspect of the present invention, the disc brake caliper according to the first aspect is configured so that the caliper main-body further includes a recess configured to arrange a piston such that the piston moves in a first direction. The facing surface is parallel to the first direction.

In accordance with a third aspect of the present invention, the disc brake caliper according to the second aspect is configured so that the attachment structure includes an attachment hole provided on the facing surface. The connecting member is attached to the attachment hole.

In accordance with a fourth aspect of the present invention, the disc brake caliper according to the third aspect is configured so that the attachment hole extends in a second direction perpendicular to the first direction.

In accordance with a fifth aspect of the present invention, the disc brake caliper according to the third aspect is configured so that the caliper main-body further includes a mounting hole through which a mounting member is to extend in a state where the caliper main-body is mounted to the mounting portion of the bicycle frame via the mounting member. The attachment hole and the mounting hole extend in a second direction.

In accordance with a sixth aspect of the present invention, the disc brake caliper according to the fifth aspect is configured so that the second direction is perpendicular to the first direction.

In accordance with a seventh aspect of the present invention, the disc brake caliper according to the second aspect is configured so that the connecting member comprises a banjo fitting bolt configured to be coupled to a banjo.

In accordance with an eighth aspect of the present invention, the disc brake caliper according to the second aspect is configured so that the attachment structure is provided downstream of the piston in a positive rotational direction of a brake disc rotor in a state where the caliper main-body is mounted to the mounting portion of the bicycle frame.

In accordance with a ninth aspect of the present invention, the disc brake caliper according to the first aspect further comprises a base member configured to be arranged between the caliper main-body and the mounting portion of the bicycle frame and configured to be mounted to the mounting portion. The caliper main-body is configured to be coupled to the base member. The facing surface faces the mounting portion via the base member in a state where the caliper main-body is coupled to the base member.

In accordance with a tenth aspect of the present invention, the disc brake caliper according to the ninth aspect is configured so that the base member includes a through-hole through which the connecting member is to extend in a state where the connecting member is attached to the attachment structure.

In accordance with an eleventh aspect of the present invention, a bicycle click brake caliper comprises a caliper main-body. The caliper main-body includes a slit, a facing surface and an attachment structure. A brake disc rotor is to be arranged in the slit. The slit includes an outlet opening from which the brake disc rotor is to exit in a positive rotational direction of the brake disc rotor. The facing surface is configured to face in the positive rotational direction. A connecting member is to be attached to the attachment structure. The connecting member is configured to be connected to a fluid hose. The attachment structure is provided on the facing surface.

In accordance with a twelfth aspect of the present invention, a disc brake caliper comprises a caliper main-body. The caliper main-body includes a recess and an attachment hole. The recess is configured to arrange a piston such that the piston moves in a first direction. A banjo fitting bolt is to be attached to the attachment hole. The attachment hole extends in a second direction non-parallel to the first direction.

In accordance with a thirteenth aspect of the present invention, the disc brake caliper according to the twelfth aspect is configured so that the caliper main-body further includes a facing surface configured to face a mounting portion of a bicycle frame. The attachment hole is provided on the facing surface.

In accordance with a fourteenth aspect of the present invention, a disc brake caliper comprises a caliper main-body and a connecting member. The caliper main-body includes an attachment hole and a caliper fluid passage extending from the attachment hole. The connecting member is configured to be connected to a fluid hose. The connecting member is configured to be attached to the attachment hole to couple the caliper main-body to one of a mounting portion of a bicycle frame and a base member configured to mount the caliper main-body to the mounting portion.

In accordance with a fifteenth aspect of the present invention, the disc brake caliper according to the fourteenth aspect is configured so that the connecting member comprises a banjo fitting bolt including an intermediate fluid passage configured to connect a banjo fluid passage of a banjo to the caliper fluid passage.

In accordance with a sixteenth aspect of the present invention, the disc brake caliper according to the fifteenth aspect is configured so that the caliper main-body further includes a facing surface configured to face the mounting portion of the bicycle frame. The attachment hole is provided on the facing surface.

In accordance with a seventeenth aspect of the present invention, a base member for mounting a caliper main-body to a mounting portion of a bicycle frame comprises a through-hole through which a connecting member configured to be connected to a fluid hose and to be attached to the caliper main-body is to extend.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
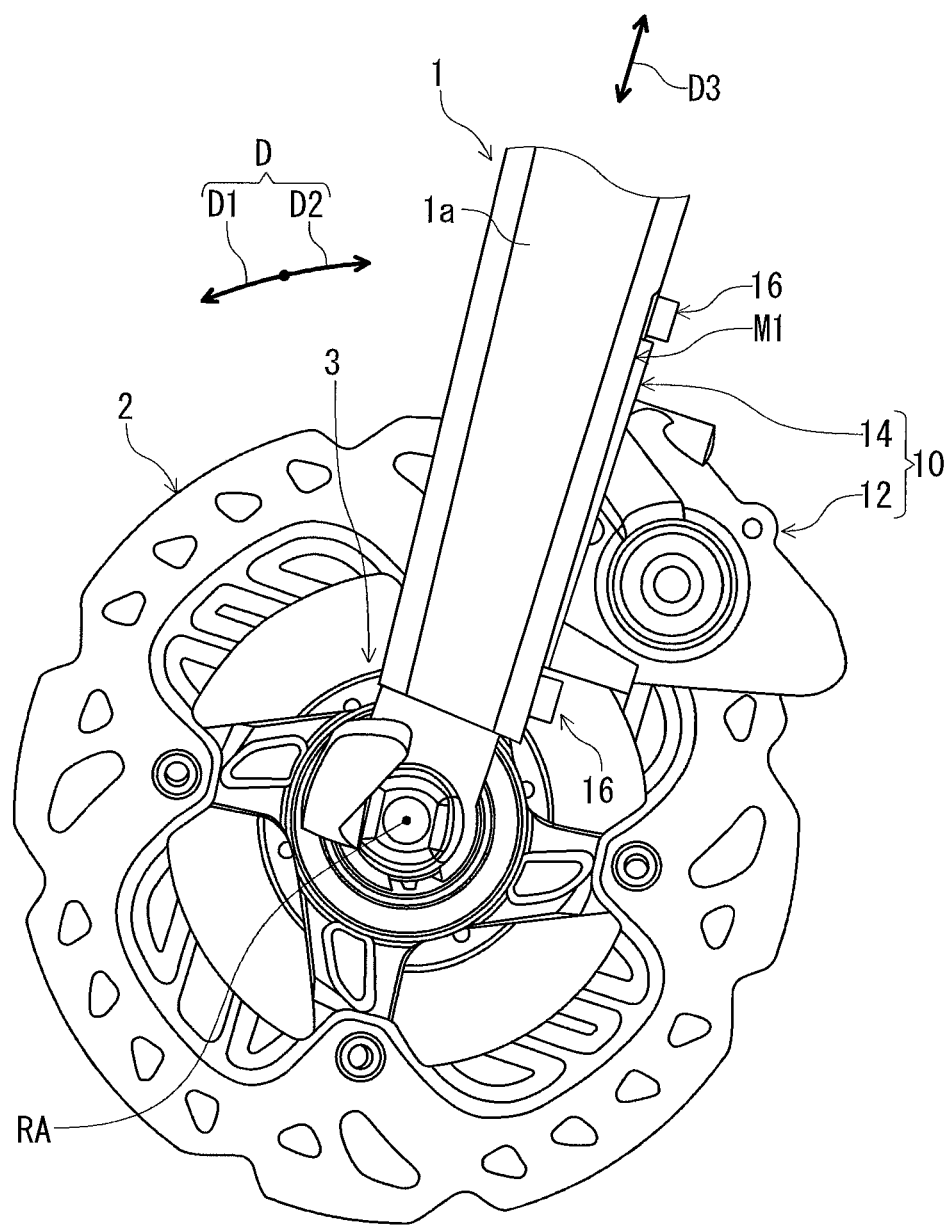
FIG. 1 is a partial side elevational view of a bicycle with a disc brake caliper in accordance with a first embodiment.

The embodiments will now be described with reference to the accompanying drawings, wherein like reference numerals designate corresponding or identical elements throughout the various drawings.

First Embodiment

Referring initially to FIG. 1, a part of a bicycle is illustrated that includes a disc brake caliper 10 in accordance with a first embodiment. The disc brake caliper 10 is mounted to a bicycle frame 1. The disc brake caliper 10 is constructed for selectively gripping (stopping rotation) of a brake disc rotor 2 that is fixedly attached to a bicycle hub assembly 3 of a bicycle wheel (not shown). The brake disc rotor 2 is rotatable relative to the bicycle frame 1 about a rotational axis RA in a rotational direction D. The rotational direction D includes a positive rotational direction D1 and a negative rotational direction D2 opposite to the positive rotational direction D1. The positive rotational direction D1 of the brake disc rotor 2 is defined as a direction in which the brake disc rotor 2 rotates when the bicycle moves forward. The negative rotational direction D2 of the brake disc rotor 2 is defined as a direction in which the brake disc rotor 2 rotates when the bicycle moves rearward. In the illustrated embodiment, the disc brake caliper 10 is a front disc brake and is mounted to a front fork 1a of the bicycle frame 1. The disc brake caliper 10 can, however, be applied to a rear disc brake. The disc brake caliper 10 is configured to be actuated by a hydraulic fluid provided from an operating device (not shown). Since the operation device includes structures which have been known in the bicycle field, the operating device will not be described and/or illustrated in detail herein for the sake of brevity.

In the present application, the following directional terms "front", "rear", "forward", "rearward", "left", "right", "transverse", "upward" and "downward" as well as any other similar directional terms refer to those directions which are determined on the basis of a rider who sits on a saddle (not shown) of the bicycle with facing a handlebar (not shown), for example. Accordingly, these terms, as utilized to describe the disc brake caliper, should be interpreted relative to the bicycle as used in an upright riding position on a horizontal surface.

As seen in FIG. 1, the disc brake caliper 10 comprises a caliper main-body 12. The caliper main-body 12 is fluidly connected to the operating device. In the illustrated embodiment, the disc brake caliper 10 is so configured that relative position between the rotational axis RA and the caliper main-body 12 is adjustable in a radial direction D3 of the brake disc rotor 2. More specifically, the disc brake caliper 10 further comprises a base member 14 for mounting the caliper main-body 12 to a mounting portion M1 of the bicycle frame 1. The base member 14 is a separate member from the caliper main-body 12. The caliper main-body 12 and the base member 14 are made of metallic material such as an aluminum alloy or iron. The base member 14 is configured to be arranged between the caliper main-body 12 and the mounting portion M1 of the bicycle frame 1. The caliper main-body 12 is configured to be coupled to the base member 14. The base member 14 is configured to be mounted to the mounting portion M1. In the illustrated embodiment, the base member 14 is mounted to the front fork 1a of the bicycle frame 1 by a pair of first mounting members 16 (e.g., bolts). The base member 14 is configured to be coupled to the caliper main-body 12 and to be attached to the bicycle frame 1 (the front fork 1a) such that relative position between the rotational axis RA and the caliper main-body 12 is adjustable in the radial direction D3 of the brake disc rotor 2. The base member 14 will be described and/or illustrated in detail later.

Figure 2:
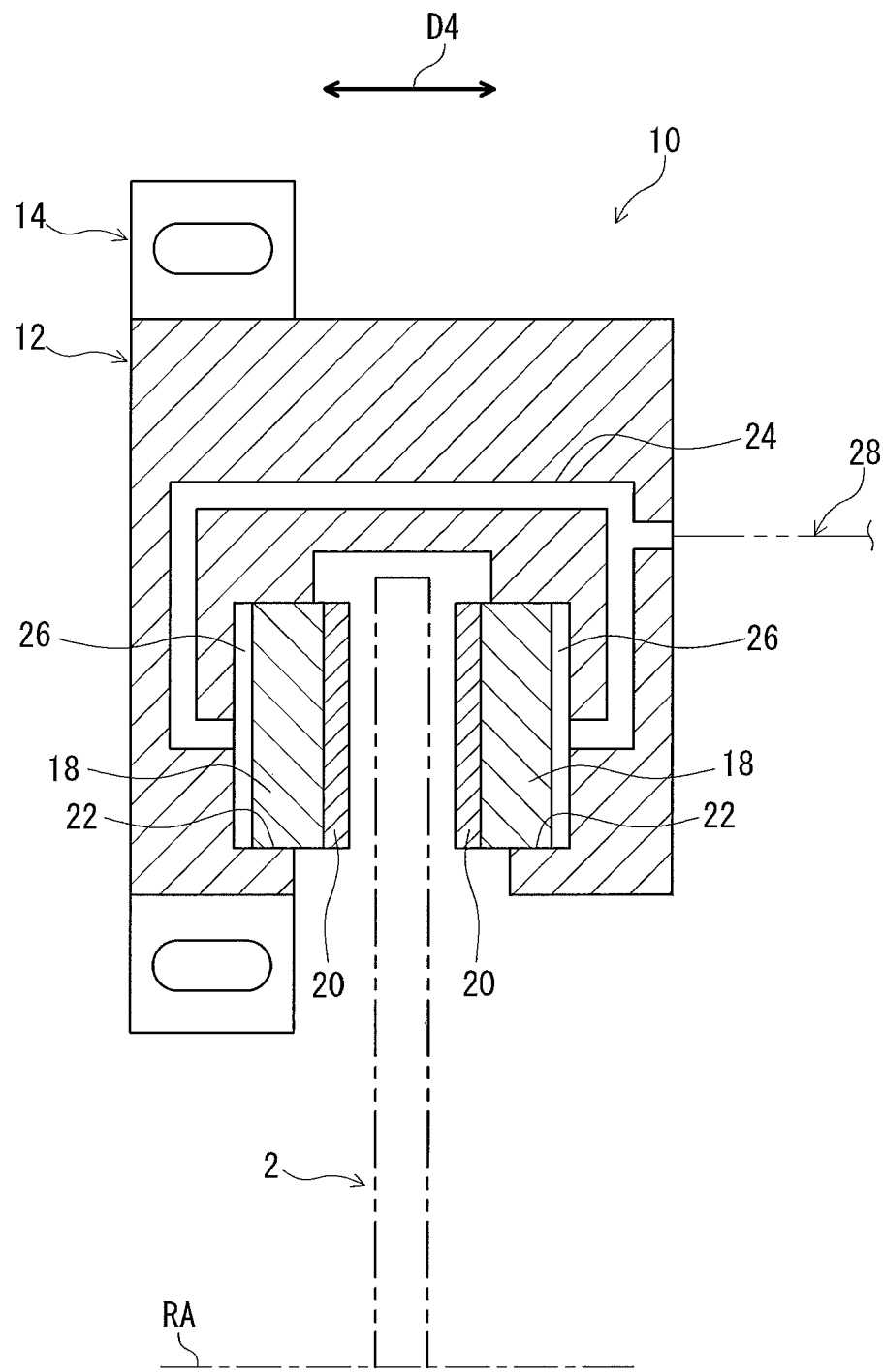
FIG. 2 is a schematic structural diagram of the disc brake caliper illustrated in FIG. 1.

As seen in FIG. 2, the disc brake caliper 10 further comprises a pair of pistons 18 and a pair of brake pads 20. The pistons 18 are arranged to press the brake pads 20 toward the brake disc rotor 2, respectively. The caliper main-body 12 further includes recesses 22 and a caliper fluid passage 24. The recess 22 is configured to arrange the piston 18 such that the piston 18 moves in a first direction (a transverse direction) D4. Fluid chambers 26 are defined by the pistons 18 and the recesses 22, respectively. The Fluid chambers 26 are in fluid communication with the caliper fluid passage 24. The caliper fluid passage 24 is in fluid communication with a master cylinder (not shown) of the operating device via a fluid hose 28. In the illustrated embodiment, the first direction D4 is parallel to the rotational axis RA of the brake disc rotor 2 in a state where the disc brake caliper 10 is mounted to the front fork 1a of the bicycle frame 1 (FIG. 1). However, the first direction D4 can be non-parallel to the rotational axis RA.

Figure 3:
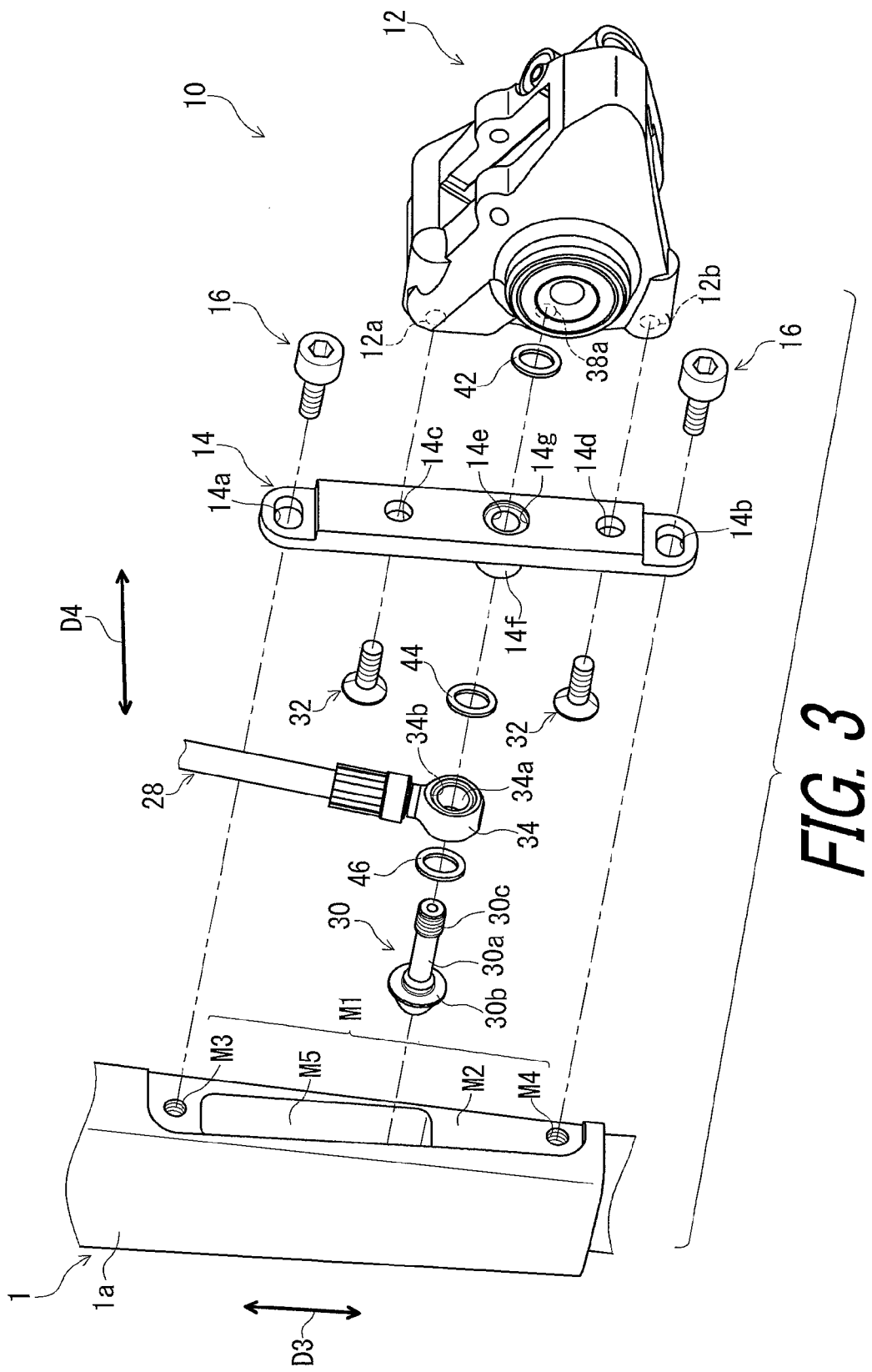
FIG. 3 is an exploded perspective view of the disc brake caliper illustrated in FIG. 1.

As seen in FIG. 3, the base member 14 is mounted to the mounting portion M1 of the bicycle frame 1 by the first mounting members 16. The base member 14 includes a pair of first mounting holes 14a and 14b. The first mounting holes 14a and 14b are configured as a through hole without having a thread portion, respectively. The first mounting members 16 extend through the first mounting holes 14a and 14b respectively in a state where the disc brake caliper 10 is mounted to the mounting portion M1 of the bicycle frame 1. In the disc brake caliper 10 depicted in FIG. 3, parts other than the caliper main-body 12 (e.g., the brake pads 20 and the pistons 18) are omitted for the sake of brevity.

The mounting portion M1 of the bicycle frame 1 includes a mounting surface M2 and a pair of threaded holes M3 and M4 provided on the mounting surface M2. The mounting surface M2 is configured to contact the base member 14. The base member 14 is mounted on the mounting surface M2 of the bicycle frame 1. The first mounting members 16 are attached to the threaded holes M3 and M4. The mounting portion M1 further includes a cavity M5. The cavity M5 is provided between the threaded holes M3 and M4. The disc brake caliper 10 further includes a connecting member 30. The connecting member 30 is at least partially disposed in the cavity M5 in a state where the disc brake caliper 10 is mounted to the bicycle frame 1.

The disc brake caliper 10 includes a pair of second mounting members 32 (e.g., bolts). The base member 14 includes a pair of second mounting holes 14c and 14d. The second mounting holes 14c and 14d are configured as a through hole without having a thread portion, respectively. The base member 14 is mounted or coupled to the caliper main-body 12 using the second mounting members 32. The second mounting members 32 extend through the second mounting holes 14c and 14d respectively in a state where the base member 14 is coupled to the caliper main-body 12.

Figure 4:
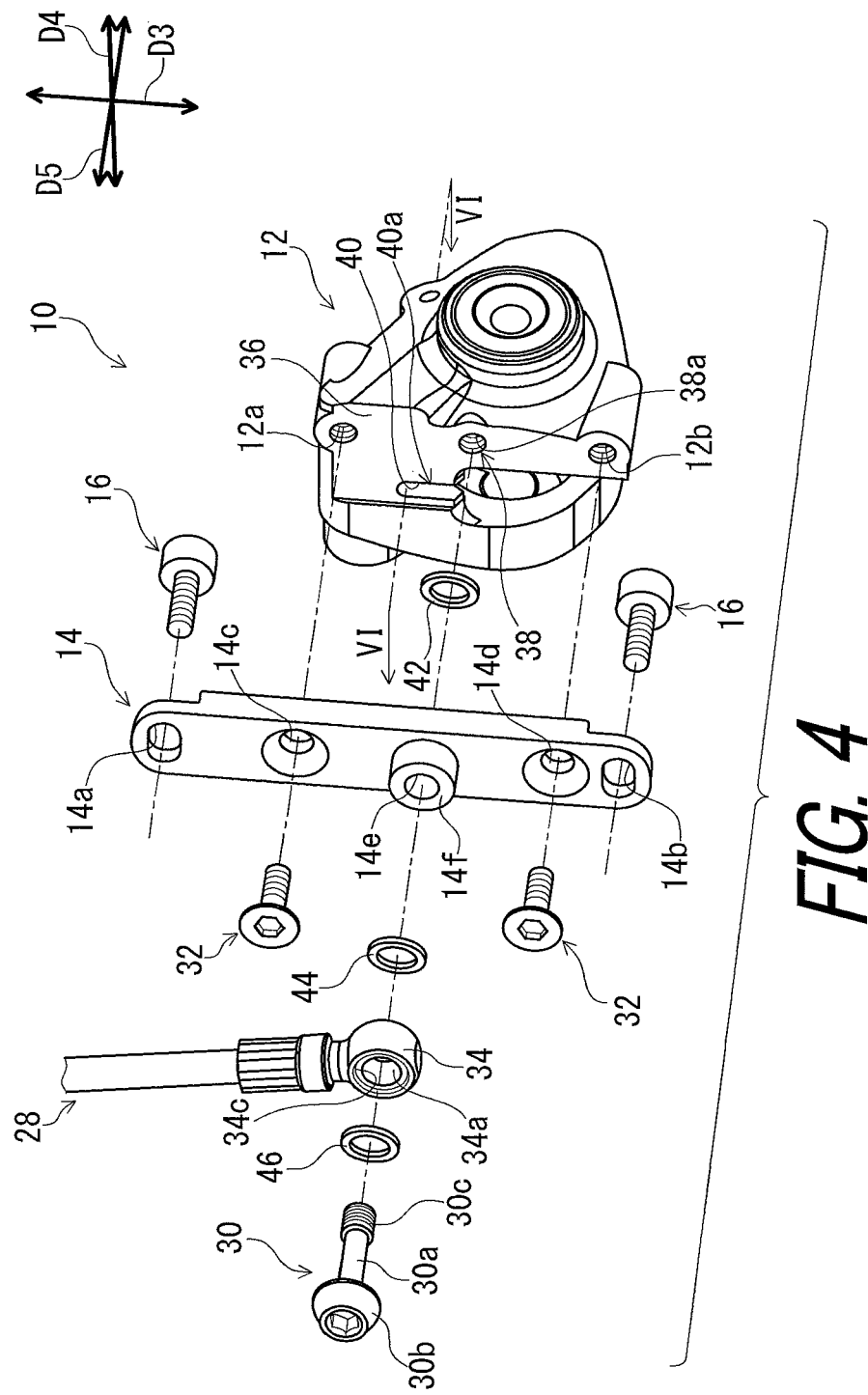
FIG. 4 is an exploded perspective view of the disc brake caliper illustrated in FIG. 1.

As seen in FIG. 4, the caliper main-body 12 further includes third mounting holes 12a and 12b through which the second mounting members 32 are to extend respectively in a state where the caliper main-body 12 is mounted to the mounting portion M1 of the bicycle frame 1 via the first mounting members 16 and the second mounting members 32. In the illustrated embodiment, each of the third mounting holes 12a and 12b includes a threaded hole. The second mounting members 32 are threaded into the third mounting holes 12a and 12b in a state where the base member 14 is coupled to the caliper main-body 12. In this first embodiment, the third mounting holes and the second mounting members correspond to "mounting hole" and "mounting member" defined in claim.

The connecting member 30 is configured to be connected to the fluid hose 28 and to be attached to the caliper main-body 12. The fluid hose 28 includes a banjo 34 provided at an end of the fluid hose 28. In the illustrated embodiment, the connecting member 30 comprises a banjo fitting bolt configured to be coupled to the banjo 34. The connecting member 30 can hereinafter be referred to as a banjo fitting bolt 30. In the illustrated embodiment, the fluid hose 28 is connected to the caliper main-body 12 by the banjo fitting bolt 30 and the banjo 34. The connecting member 30 can, however, include structures other than a banjo fitting bolt if needed and/or desired.

Figure 5:
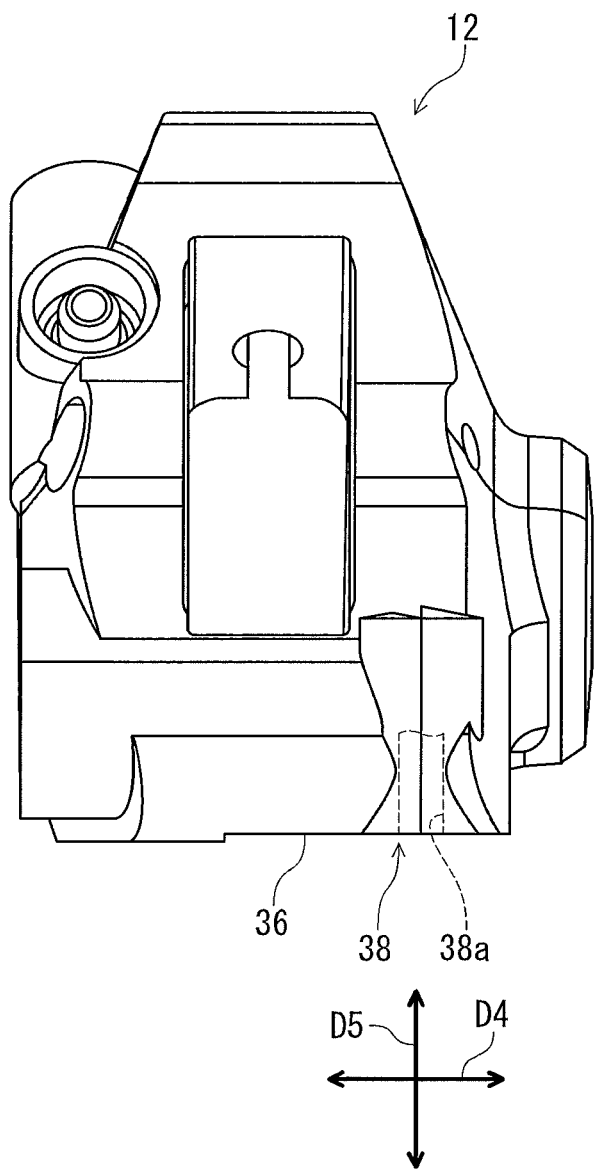
FIG. 5 is a top view of a caliper main-body of the disc brake caliper illustrated in FIG. 1.

The caliper main-body 12 includes a facing surface 36 and an attachment structure 38 to which the banjo fitting bolt 30 is to be attached. The attachment structure 38 is provided on the facing surface 36. In the illustrated embodiment, as seen in FIG. 5, the facing surface 36 is parallel to the first direction D4. However, the facing surface 36 can be non-parallel to the first direction D4 and can be inclined with respect to the first direction D4 if needed and/or desired.

Figure 6:
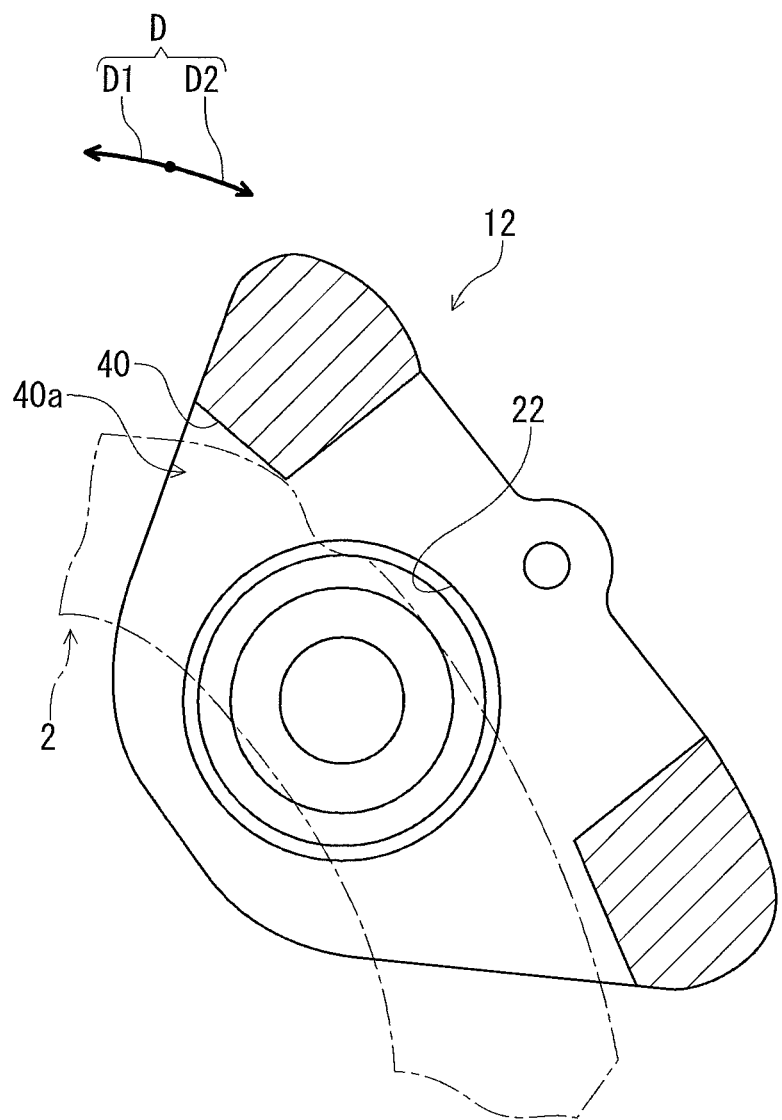
FIG. 6 is a cross-sectional view of a caliper main-body of the disc brake caliper taken along line VI-VI of FIG. 4.

As seen in FIGS. 4 and 6, the caliper main-body 12 includes a slit 40 in which the brake disc rotor 2 is to be arranged. The slit 40 includes an outlet opening 40a from which the brake disc rotor 2 is to exit in the positive rotational direction D1 of the brake disc rotor 2 (FIG. 6). The outlet opening 40a is provided on the facing surface 36.

As seen in FIG. 4, the attachment structure 38 includes an attachment hole 38a provided on the facing surface 36. The banjo fitting bolt 30 is attached to the attachment hole 38a. In other words, the caliper main-body 12 includes the attachment hole 38a to which the banjo fitting bolt 30 is to be attached. The attachment hole 38a extends in a second direction D5 non-parallel to the first direction D4. In the illustrated embodiment, as seen in FIG. 5, the attachment hole 38a extends in the second direction D5 perpendicular to the first direction D4 and in a substantial forward and rearward direction. However, the attachment hole 38a can be disposed to extend in a direction which is not perpendicular to the first direction D4 if needed and/or desired.

As seen in FIG. 4, the attachment hole 38a and the third mounting holes 12a and 12b extend in the second direction D5. In the illustrated embodiment, the second direction D5 is perpendicular to the first direction D4 as described above. However, the attachment hole 38a and the third mounting holes 12a and 12b can be disposed to extend to other direction than the direction D5 if needed and/or desired.

As seen in FIG. 4, the base member 14 comprises a through-hole 14e through which the banjo fitting bolt 30 is to extend in a state where the banjo fitting bolt 30 is attached to the attachment structure 38. The base member 14 includes a cylindrical protrusion 14f defining a part of the through-hole 14e. The banjo fitting bolt (connecting member) 30 includes a shaft portion 30a and a head portion 30b provided at an end of the shaft portion 30a. The shaft portion 30a includes an externally threaded part 30c. The banjo 34 includes a banjo opening 34a through which the connecting member 30 is to extend. The shaft portion 30a extends through the banjo opening 34a and the through-hole 14e of the base member 14 and is screwed in the attachment hole 38a in a state where the banjo 34 and the base member 14 are attached to the caliper main-body 12.

Figure 7:
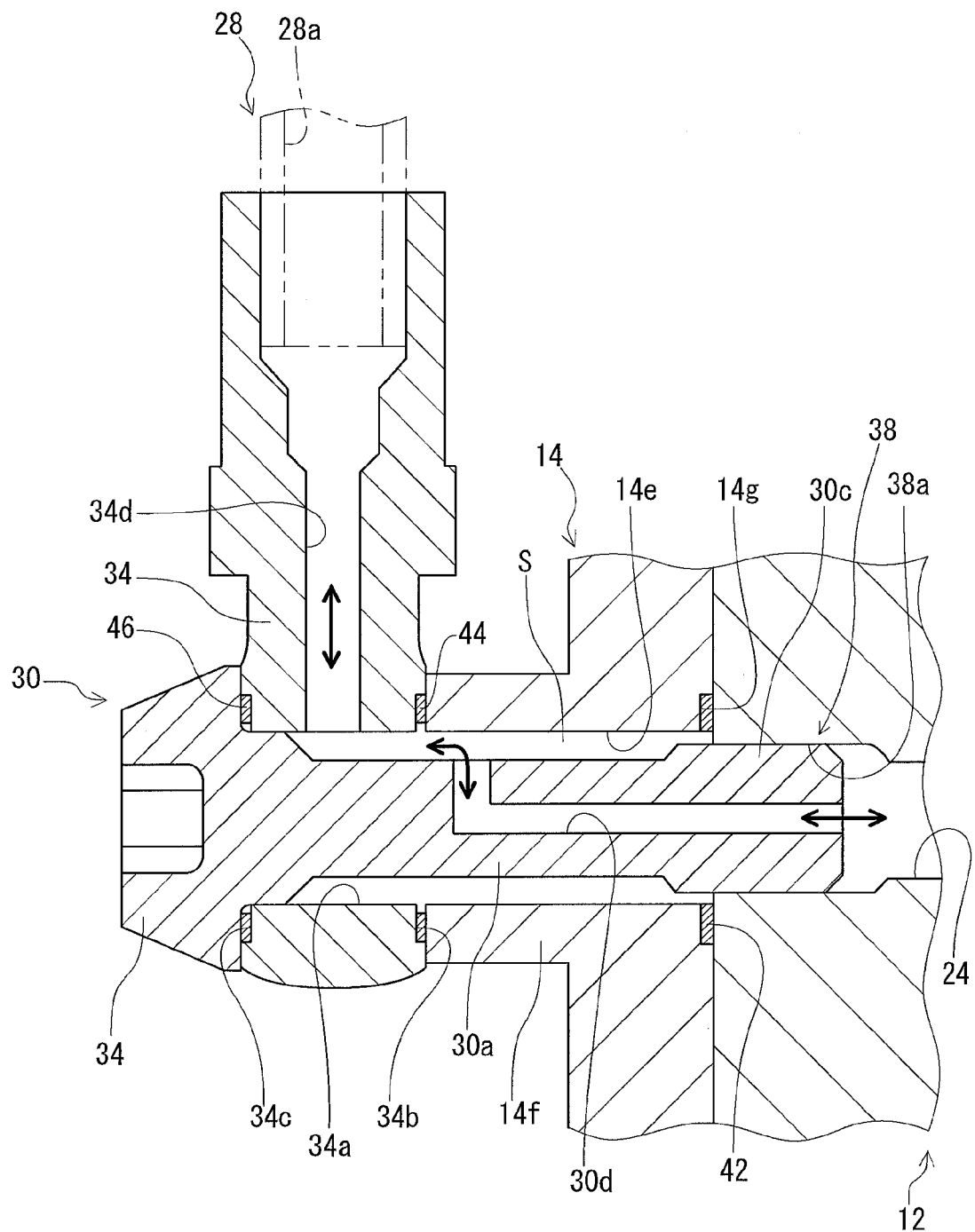
FIG. 7 is a partial cross-sectional view of the disc brake caliper illustrated in FIG. 1.

As seen in FIG. 7, a seal member 42 is provided in an annular recess 14g of the base member 14 between the base member 14 and the caliper main-body 12. A seal member 44 is provided in an annular recess 34b of the banjo 34 between the banjo 34 and the cylindrical protrusion 14f of the base member 14. A seal member 46 is provided in an annular recess 34c of the banjo 34 between the banjo 34 and the head portion 30b of the connecting member 30.

The banjo 34 includes a banjo fluid passage 34d in fluid communication with a fluid passage 28a of the fluid hose 28. The caliper fluid passage 24 extends from the attachment hole 38a. The caliper fluid passage 24 of the caliper main-body 12 is in fluid communication with the attachment hole 38a of the attachment structure 38. A fluid passage space S is defined by the banjo fitting bolt 30, the banjo 34, and the base member 14 in a state where the banjo 34 is attached to the base member 14 with the banjo fitting bolt 30. The fluid passage space S is sealed by the seal members 42, 44 and 46. The fluid passage space S is in fluid communication with the banjo fluid passage 34d. The banjo fitting bolt 30 includes an intermediate fluid passage 30d configured to connect the banjo fluid passage 34d of the banjo 34 to the caliper fluid passage 24. The intermediate fluid passage 30d is configured to connect the fluid passage space S to the caliper fluid passage 24. Accordingly, the banjo fluid passage 34d is in fluid communication with the caliper fluid passage 24 via the fluid passage space S and the intermediate fluid passage 30d.

Figure 8:
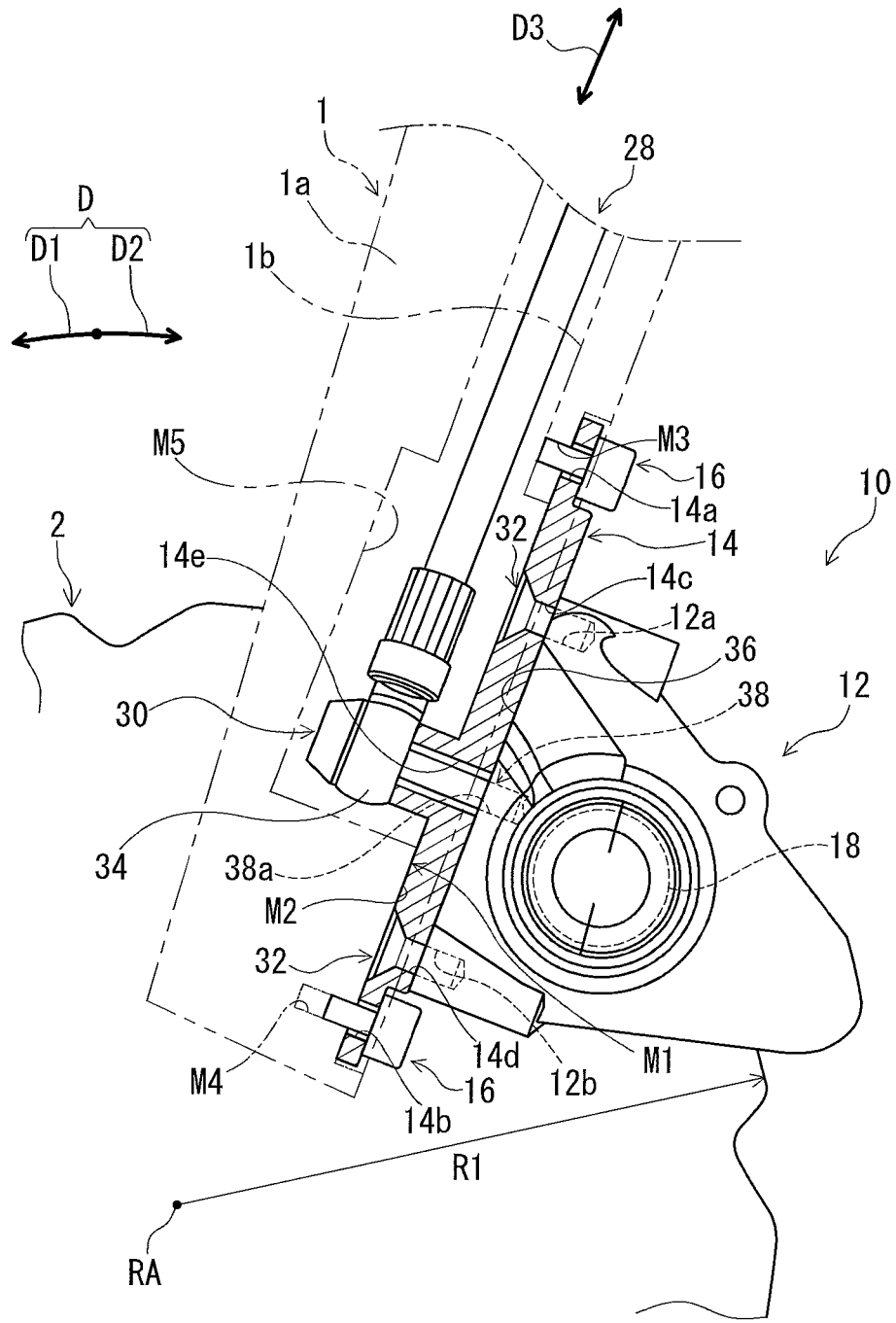
FIG. 8 is an elevational view of the disc brake caliper illustrated in FIG. 1 (first position)

As seen in FIG. 8, the front fork 1a includes a hose duct 1b extending along the front fork 1a from the cavity M5 toward an upper portion of the front fork 1a. The fluid hose 28 extends through the hose duct 1b. The hose duct 1b includes an inlet opening (not shown) at the upper portion of the front fork 1a. The fluid hose 28 passes through the inlet opening of the hose duct 1b and is fluidly connected to the master cylinder of the operating device.

The facing surface 36 is configured to face the mounting portion M1 of the bicycle frame 1 to which the disc brake caliper 10 is attached. In the illustrated embodiment, the facing surface 36 faces the mounting portion M1 via the base member 14 in a state where the caliper main-body 12 is coupled to the base member 14. Further, the facing surface 36 faces in the positive rotational direction D1. The attachment structure 38 is provided downstream of the piston 18 in the positive rotational direction D1 of the brake disc rotor 2 in a state where the caliper main-body 12 is mounted to the mounting portion M1 of the bicycle frame 1. The arrangements of the facing surface 36 and the attachment structure 38 are not limited to the illustrated embodiment. For example, the facing surface 36 can be disposed to face in a direction other than the positive rotational direction D1.

With the disc brake caliper 10, the attachment structure 38 to which the banjo fitting bolt 30 is to be attached is provided on the facing surface 36 configured to face the mounting portion M1 of the bicycle frame 1. Accordingly, at least part of the banjo fitting bolt (connecting member) 30 and/or the fluid hose 28 is less likely to be seen in a state where the disc brake caliper 10 is mounted to the mounting portion M1 of the bicycle frame 1. This allows appearance of the disc brake caliper 10 to be simplified.

Figure 9:
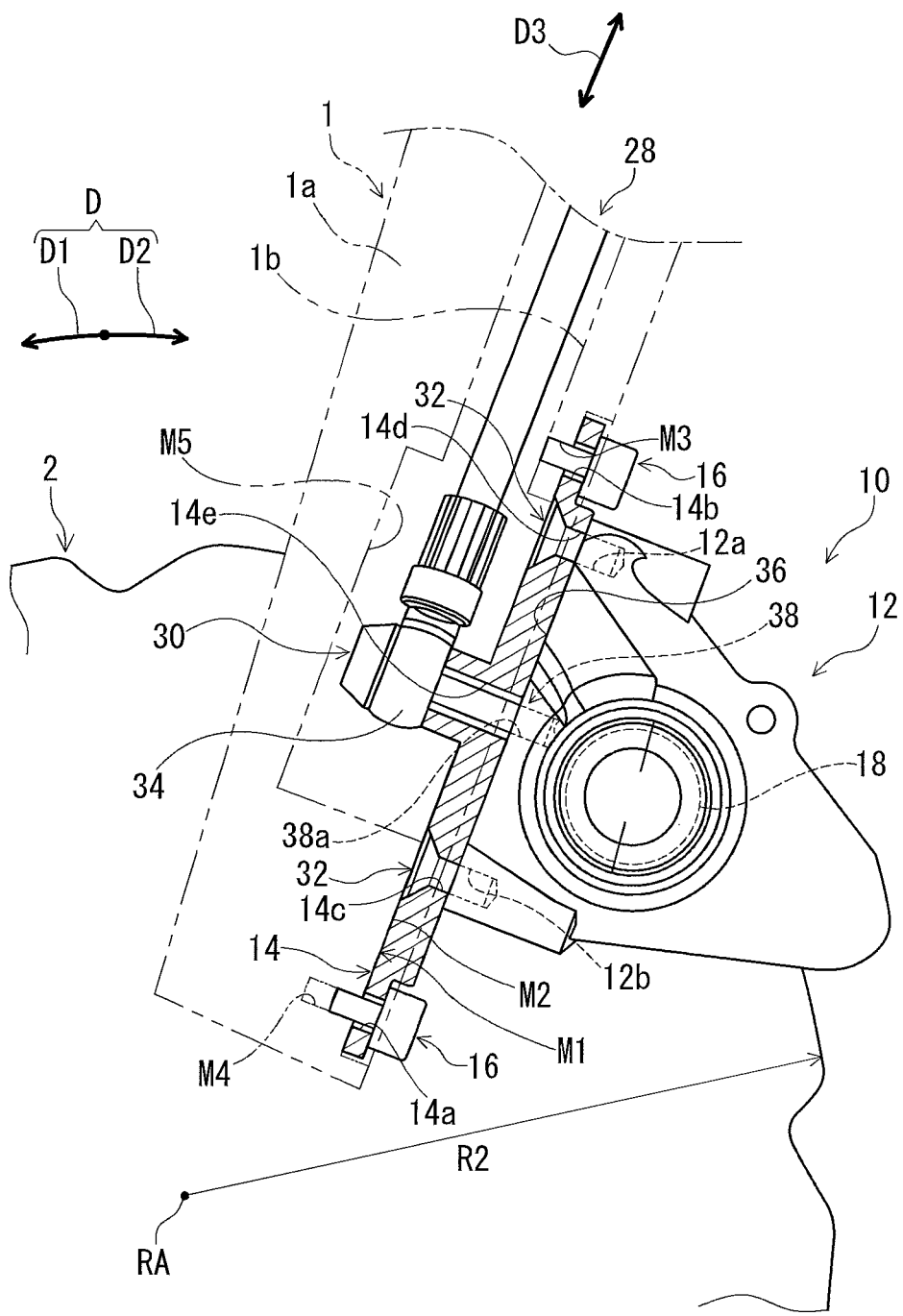
FIG. 9 is an elevational view of the disc brake caliper illustrated in FIG. 1 (second position)

As seen in FIG. 8, the through-hole 14e is closer to the first mounting hole 14b than the first mounting hole 14a. The through-hole 14e is disposed at a middle position between the second mounting hole 14c and the second mounting hole 14d. As seen in FIG. 9, the orientation of the base member 14 is turned upside down relative to the caliper main-body 12 compared with the orientation of the base member 14 illustrated in FIG. 8. As seen in FIGS. 8 and 9, changing the orientation of the base member 14 relative to the caliper main-body 12 allows the relative position between the rotational axis RA and the caliper main-body 12 to be adjusted to each of brake disc rotors having different outer diameters R1 and R2. The structure of the base member 14 is not limited to the illustrated embodiment. For example, the disc brake caliper 10 can has a structure such that the relative position between the rotational axis RA and the caliper main-body 12 is not adjustable.

Second Embodiment

A disc brake caliper 210 in accordance with a second embodiment will be described below referring to FIGS. 10 to 12. The disc brake caliper 210 has substantially the same configuration as the disc brake caliper 10 except for the structures of the caliper main-body and the base member. Thus, elements having substantially the same function as those in the first embodiment will be numbered the same here, and will not be described and/or illustrated again in detail here for the sake of brevity.

Figure 10:
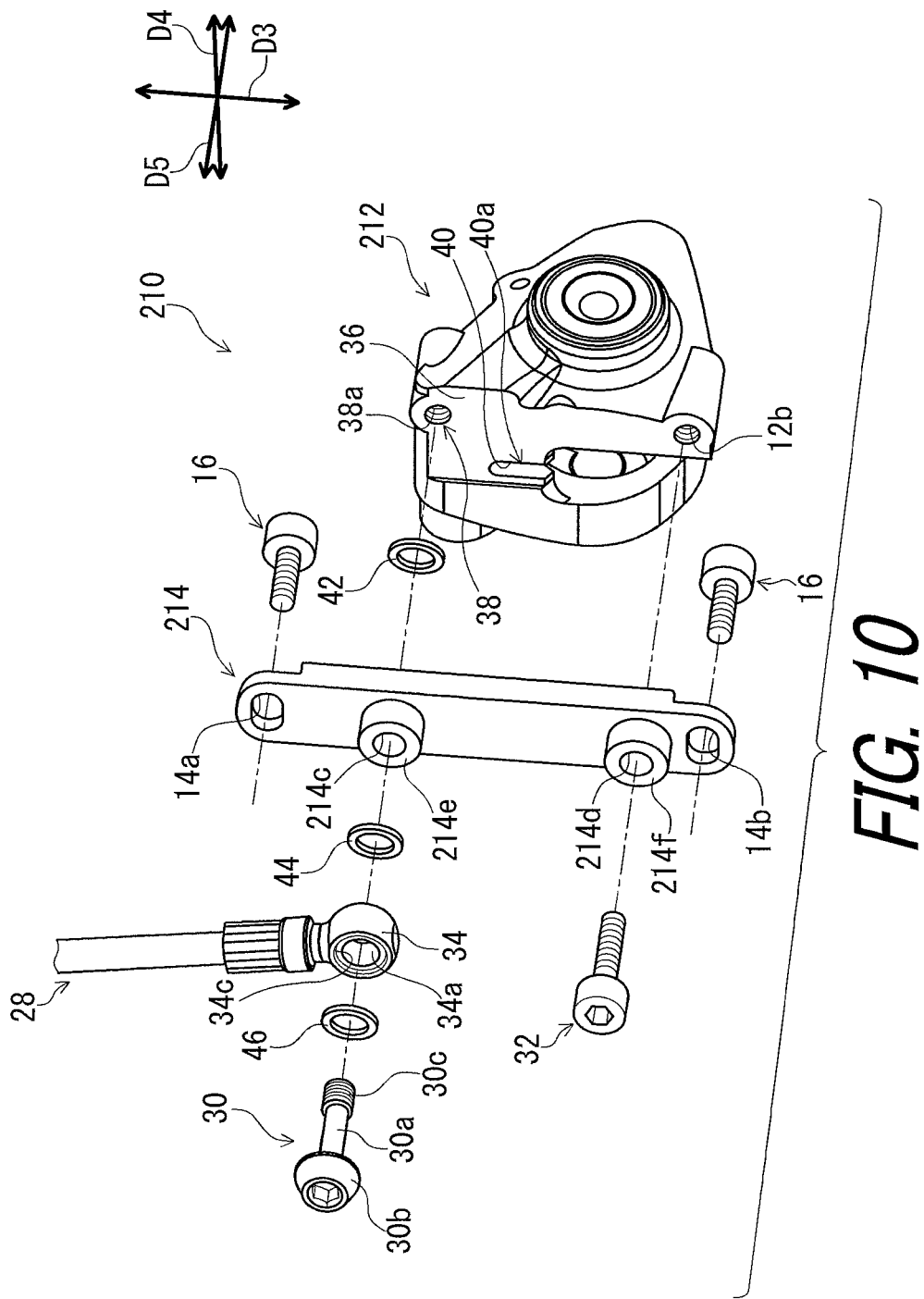
FIG. 10 is an exploded perspective view of a disc brake caliper in accordance with a second embodiment.
Figure 11:
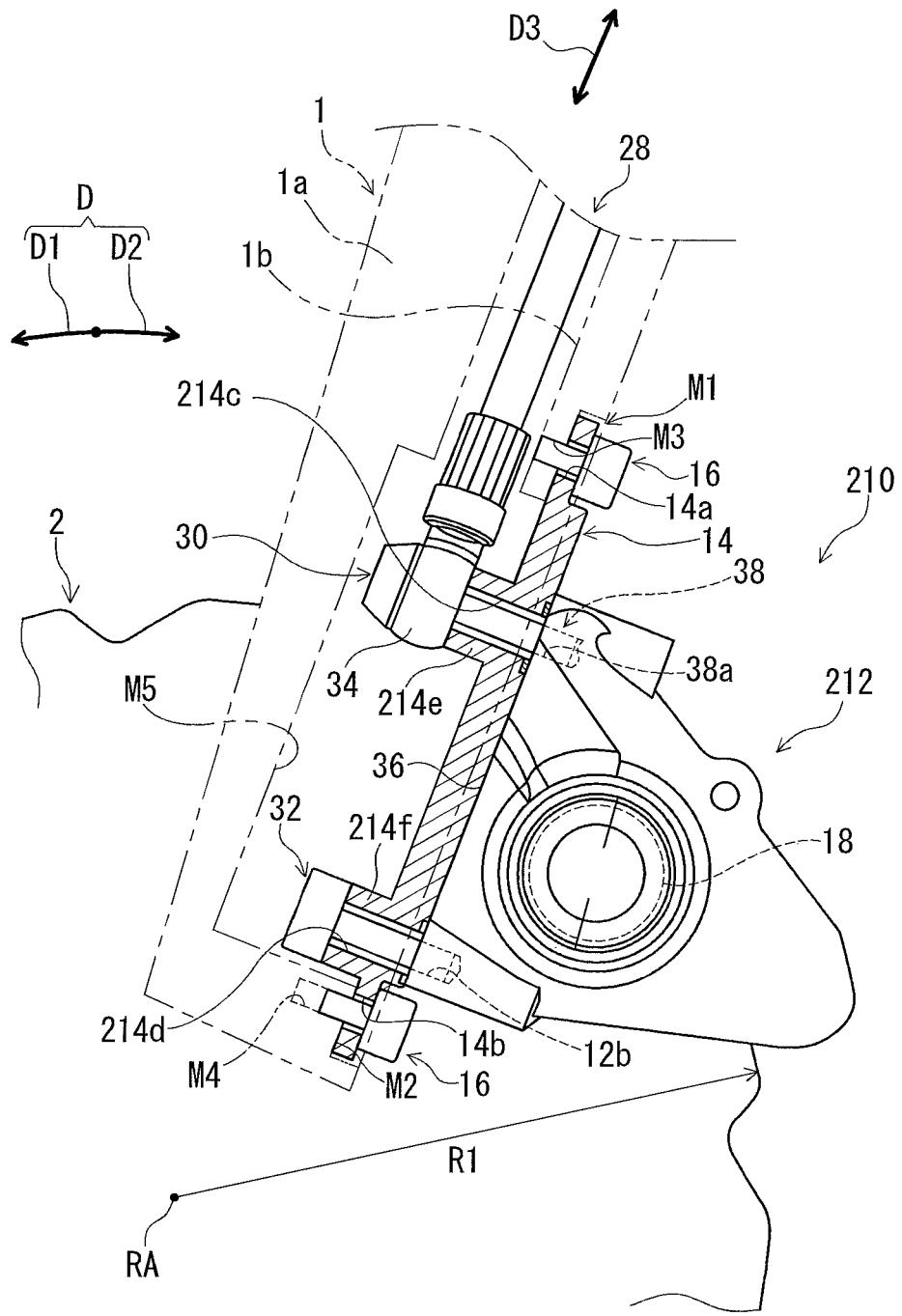
FIG. 11 is an elevational view of the disc brake caliper illustrated in FIG. 10 (first position)

As seen in FIGS. 10 and 11, the disc brake caliper 210 comprises a caliper main-body 212. The caliper main-body 212 includes the attachment hole 38a. The caliper fluid passage 24 extends from the attachment hole 38a (FIG. 7). The connecting member 30 is configured to be attached to the attachment hole 38a to couple the caliper main-body 212 to one of the mounting portion M1 of the bicycle frame 1 and a base member 214 configured to mount the caliper main-body 212 to the mounting portion M1. In the illustrated embodiment, the banjo fitting bolt 30 is configured to be attached to the attachment hole 38a to couple the caliper main-body 212 to the base member 214. Unlike the first embodiment, the banjo fitting bolt (connecting member) 30 serves as the second mounting member 32, and the base member 214 is coupled to the caliper main-body 212 using the connecting member 30 and the second mounting member 32. In other words, in comparison with the first embodiment, the third mounting hole 12a is omitted, and the attachment hole 38a is used as a mounting hole also.

The base member 214 includes second mounting holes 214c and 214d, and cylindrical protrusions 214e and 214f. The second mounting holes 214c and 214d are configured as a through hole without having a thread portion, respectively. The cylindrical protrusion 214e defines a part of the second mounting hole 214c. The cylindrical protrusion 214f defines a part of the second mounting hole 214d. The base member 214 is coupled to the caliper main-body 212 using the banjo fitting bolt 30 and the second mounting member 32. The banjo fitting bolt 30 and the second mounting member 32 extend through the second mounting holes 214c and 214d in a state where the base member 214 is coupled to the caliper main-body 212 using the banjo fitting bolt 30 and the second mounting member 32.

With the disc brake caliper 210, the attachment structure 38 to which the banjo fitting bolt 30 is to be attached is provided on the facing surface 36 configured to face the mounting portion M1 of the bicycle frame 1. Accordingly, at least part of banjo fitting bolt 30 and/or the fluid hose 28 is less likely to be seen in a state where the disc brake caliper 210 is mounted to the mounting portion M1 of the bicycle frame 1. This allows appearance of the disc brake caliper 210 to be simplified.

Furthermore, since the caliper main-body 212 is coupled to the base member 214 using the banjo fitting bolt 30, the third mounting hole 12a (FIG. 4) and one of the second mounting members 32 (FIG. 4) can be omitted. This allows the structure of the disc brake caliper 210 to be simplified.

Figure 12:
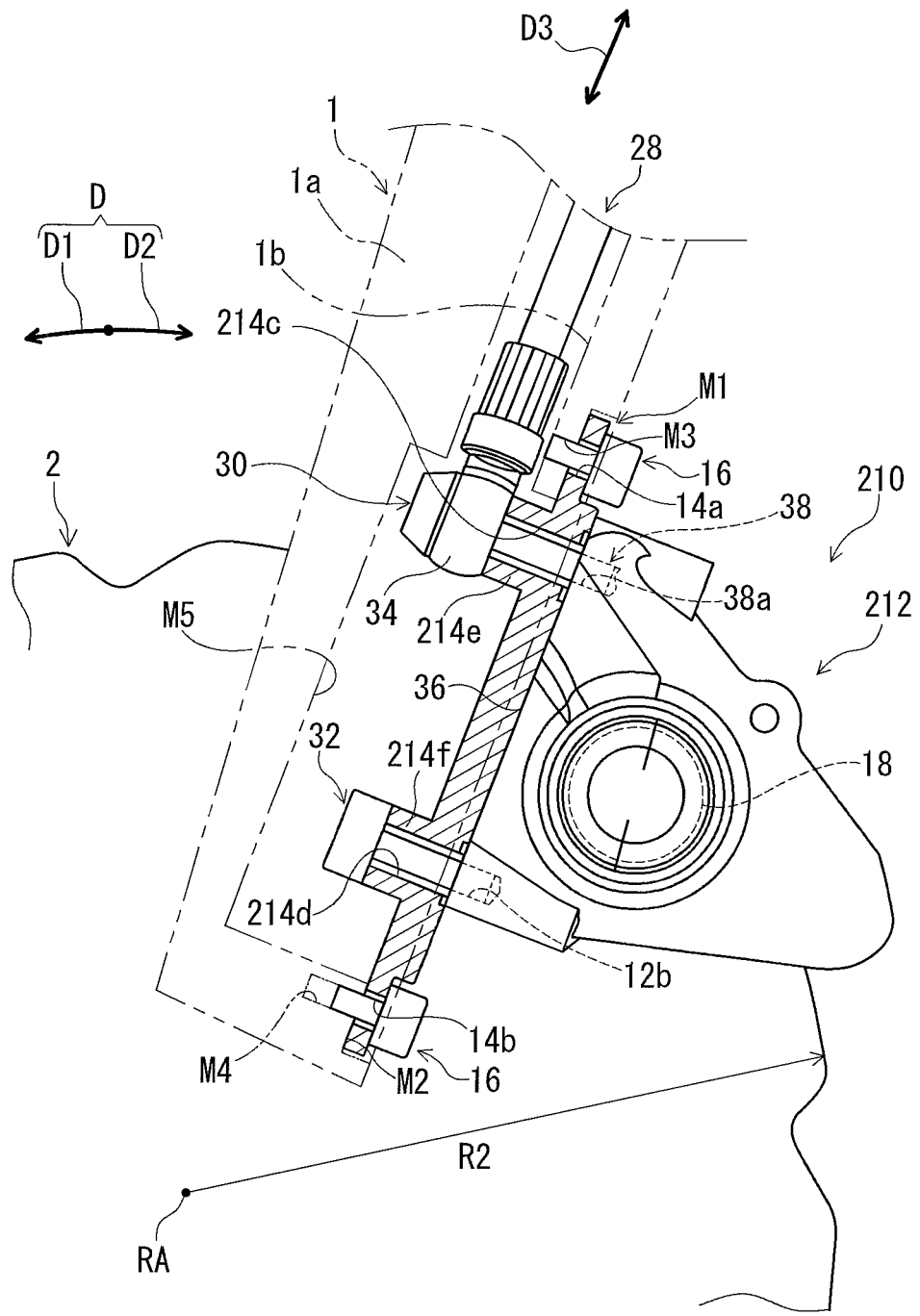
FIG. 12 is an elevational view of the disc brake caliper illustrated in FIG. 10 (second position)

As seen in FIGS. 11 and 12, changing the orientation of the base member 214 relative to the caliper main-body 212 allows the relative position between the rotational axis RA and the caliper main-body 212 to be adjusted to each of brake disc rotors having different outer diameters R1 and R2, as well as the first embodiment. The structure of the base member 214 is not limited to the illustrated embodiment. For example, the disc brake caliper 210 can has a structure such that the relative position between the rotational axis RA and the caliper main-body 212 is not adjustable.

Third Embodiment

A disc brake caliper 310 in accordance with a third embodiment will be described below referring to FIGS. 13 to 15. The disc brake caliper 310 has substantially the same configuration as the disc brake caliper 10 except for the structures of the caliper main-body and the base member. Thus, elements having substantially the same function as those in the first embodiment will be numbered the same here, and will not be described and/or illustrated again in detail here for the sake of brevity.

Figure 13:
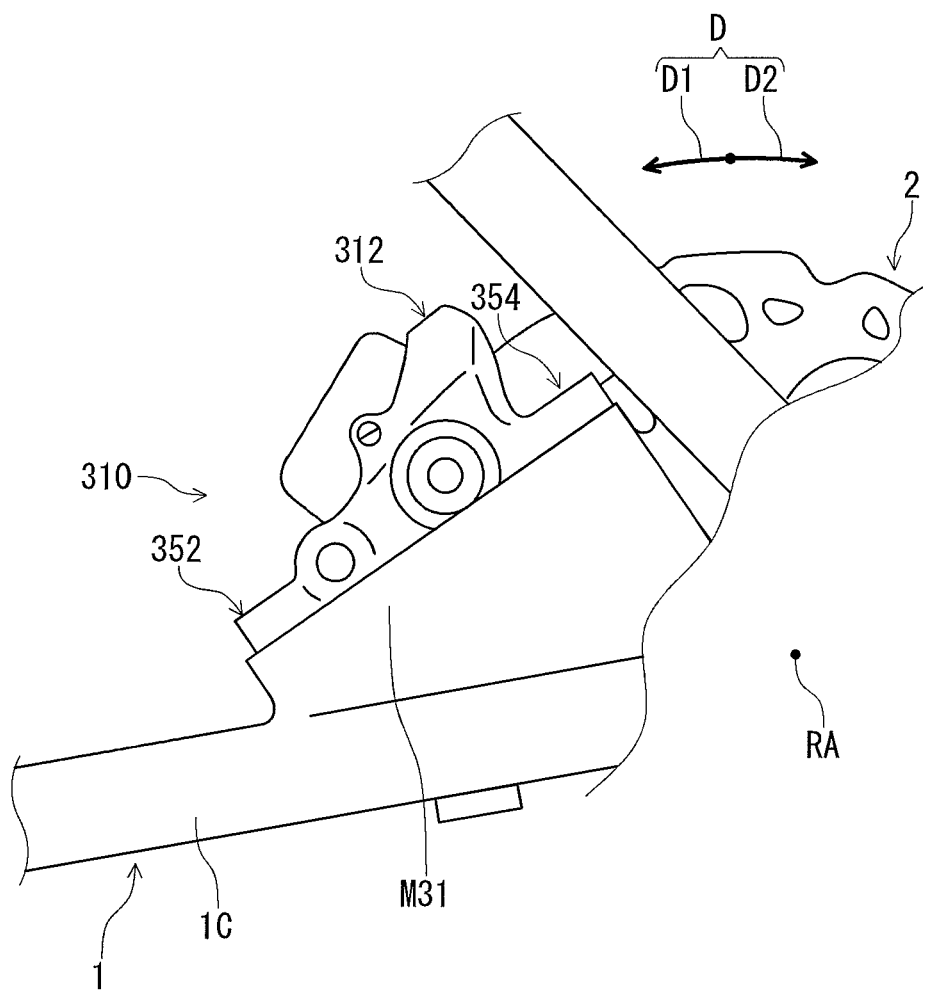
FIG. 13 is a partial side elevational view of a bicycle with a disc brake caliper in accordance with a third embodiment.

As seen in FIG. 13, the disc brake caliper 310 comprises a caliper main-body 312. The caliper main-body 312 is mounted to a mounting portion M31 of the bicycle frame 1. Since the disc brake caliper 310 is a rear disc brake, the disc brake caliper 310 is mounted to the mounting portion M31 provided on a rear stay 1c opposite to a chain stay (not shown) of the bicycle frame 1. The caliper main-body 312 includes a first coupling portion 352 and a second coupling portion 354.

The first coupling portion 352 and the second coupling portion 354 are attached to the mounting portion M31 of the bicycle frame 1.

Figure 14:
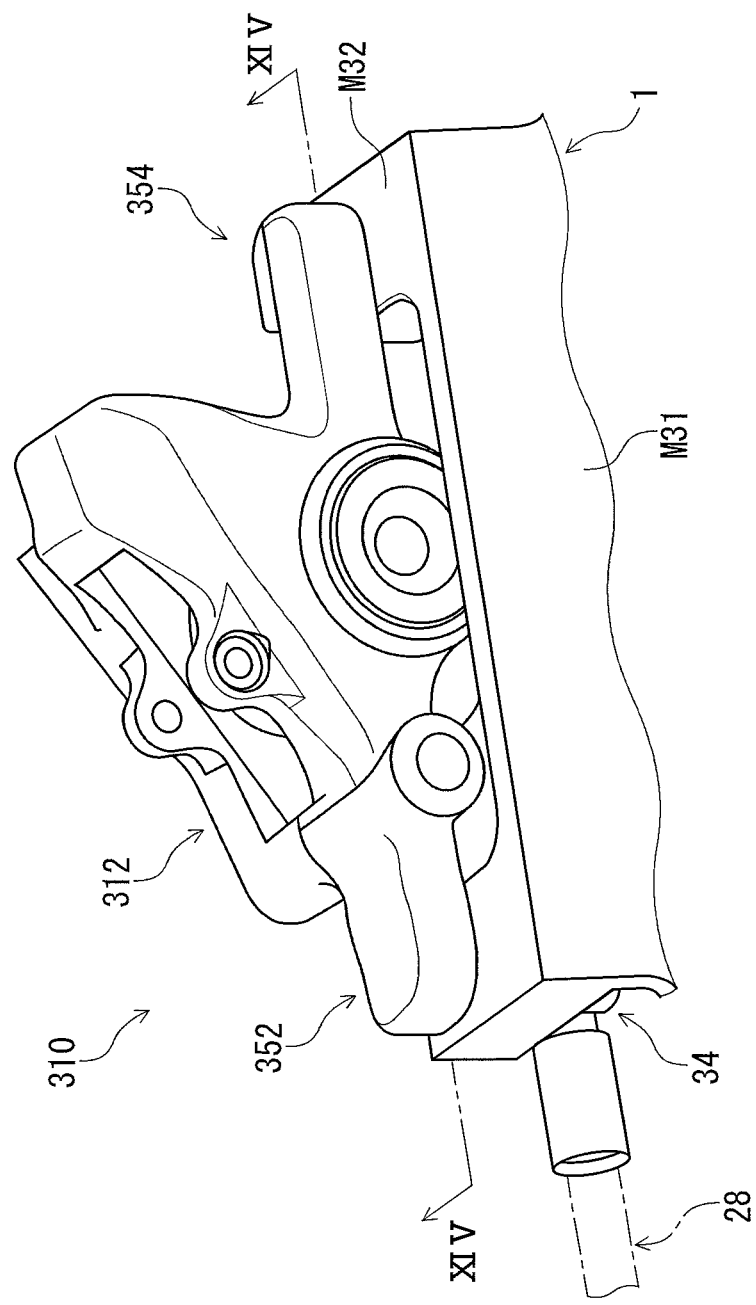
FIG. 14 is a perspective view of the disc brake caliper illustrated in FIG. 13.

As seen in FIG. 14, the mounting portion M31 of the bicycle frame 1 includes a mounting surface M32. The caliper main-body 312 is mounted on the mounting surface M32. The first coupling portion 352 and the second coupling portion 354 are disposed on the mounting surface M32.

Figure 15:
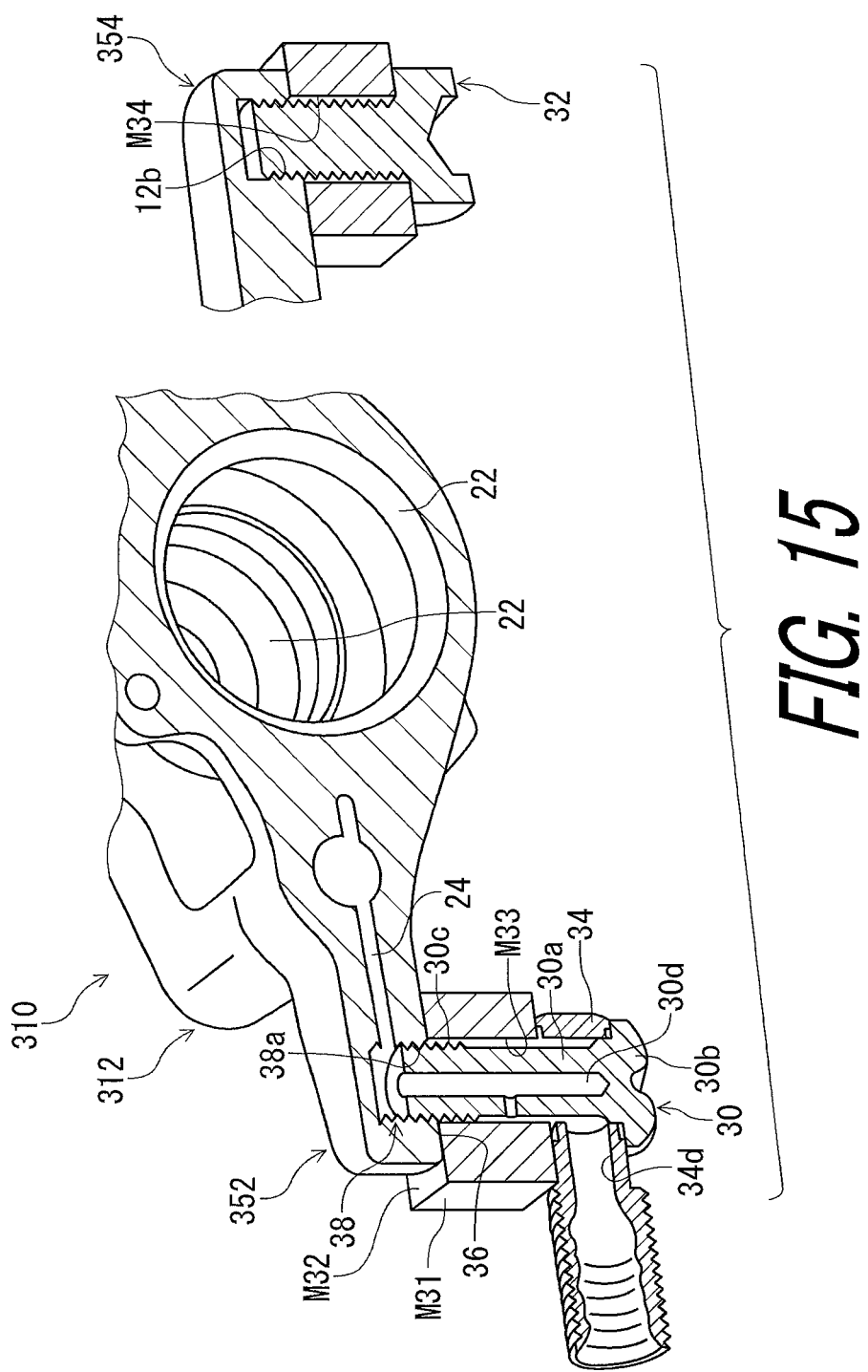
FIG. 15 is a cross-sectional view of a caliper main-body of the disc brake caliper taken along line XIV-XIV of FIG. 14.

As seen in FIG. 15, the caliper main-body 312 includes the attachment hole 38a. The caliper fluid passage 24 extends from the attachment hole 38a. The disc brake caliper 310 comprises the banjo fitting bolt 30. The banjo fitting bolt 30 is configured to be attached to the attachment hole 38a to couple the caliper main-body 312 to the mounting portion M31 of the bicycle frame 1. The attachment hole 38a of the attachment structure 38 is provided in the first coupling portion 352. The third mounting hole 12b (hereinafter, the mounting hole 12b) is provided in the second coupling portion 354. The second mounting member 32 (hereinafter, the mounting member 32 simply) is attached to the mounting hole 12b.

The mounting portion M31 of the bicycle frame 1 includes a pair of mounting through-holes M33 and M34 provided on the mounting surface M32. The banjo fitting bolt 30 and the mounting member 32 extend through the mounting through-holes M33 and M34.

As seen in FIG. 15, The facing surface 36 is provided on the first coupling portion 352. The facing surface 36 is configured to face the mounting portion M31 of the bicycle frame 1 to which the disc brake caliper 310 is attached. In the illustrated embodiment, the facing surface 36 contacts the mounting portion M31 in a state where the caliper main-body 312 is attached to the mounting portion M31.

With the disc brake caliper 310, the attachment structure 38 to which the banjo fitting bolt 30 is to be attached is provided on the facing surface 36 configured to face the mounting portion M31 of the bicycle frame 1. Accordingly, at least part of the banjo fitting bolt (connecting member) 30 and/or the fluid hose 28 is less likely to be seen in a state where the disc brake caliper 310 is mounted to the mounting portion M31 of the bicycle frame 1. This allows appearance of the disc brake caliper 310 to be simplified.

Furthermore, since the caliper main-body 312 is directly coupled to the mounting portion M31 of the bicycle frame 1 using the banjo fitting bolt 30 without base member, the third mounting hole 12a, one of the mounting members 32, and the base member 14 (FIG. 4) can be omitted. This allows the structure of the disc brake caliper 310 to be simplified.

Fourth Embodiment

A disc brake caliper 410 in accordance with a fourth embodiment will be described below referring to FIG. 16. The disc brake caliper 410 has substantially the same configuration as the disc brake caliper 10 except for the structures of the caliper main-body and the base member. Thus, elements having substantially the same function as those in the first embodiment will be numbered the same here, and will not be described and/or illustrated again in detail here for the sake of brevity.

Figure 16:
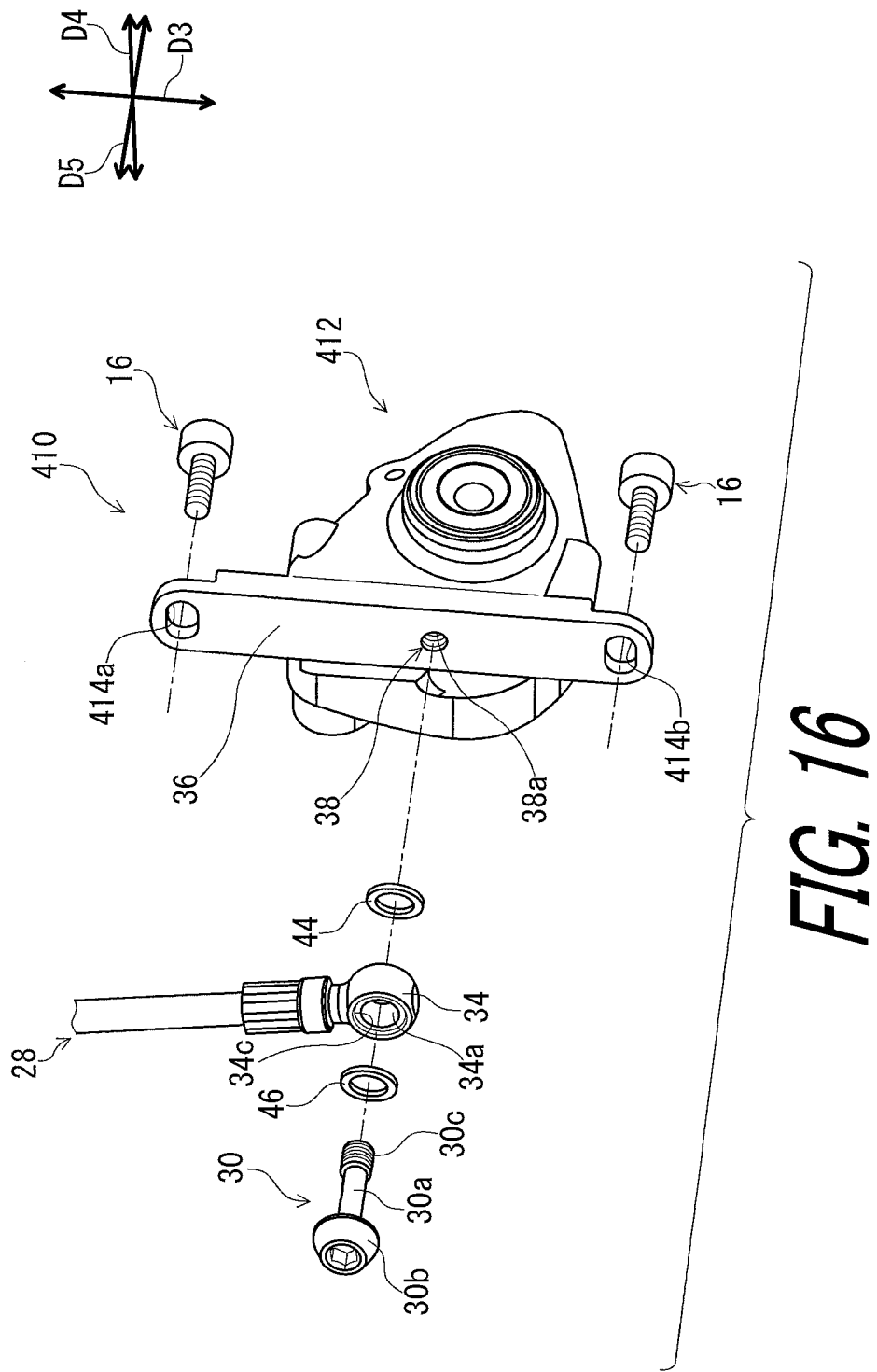
FIG. 16 is an exploded perspective view of a disc brake caliper in accordance with a fourth embodiment.

As seen in FIG. 16, the base member 14 (FIG. 3) in accordance with the first embodiment is omitted from the disc brake caliper 10. The disc brake caliper 410 comprises a caliper main-body 412. The caliper main-body 412 includes the facing surface 36 and the attachment structure 38. The caliper main-body 412 further includes first mounting holes 414a and 414b (hereinafter, the mounting holes 414a and 414b simply) which are provided on the facing surface 36.

The first mounting members 16 (hereinafter, the mounting members 16 simply) extend through the mounting holes 414a and 414b, respectively. The facing surface 36 is configured to face the mounting portion M1 of the bicycle frame 1 (FIG. 3). Since the base member 14 in accordance with the first embodiment is omitted from the disc brake caliper 10, the facing surface 36 is configured to contact the mounting portion M1 of the bicycle frame 1 (FIG. 3).

With the disc brake caliper 410, the attachment structure 38 to which the banjo fitting bolt 30 is to be attached is provided on the facing surface 36 configured to face the mounting portion M1 of the bicycle frame 1. Accordingly, at least part of the banjo fitting bolt (connecting member) 30 and/or the fluid hose 28 is less likely to be seen in a state where the disc brake caliper 410 is mounted to the mounting portion M1 of the bicycle frame 1. This allows appearance of the disc brake caliper 410 to be simplified.

In the above embodiments, the term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:
1. A disc brake caliper comprising:
a caliper main-body including:
a facing surface that faces a mounting surface of a mounting portion of a bicycle frame, the mounting surface being a surface to which the disc brake caliper is attached; and an attachment structure that receives a connecting member connected to a fluid hose, the attachment structure being provided on the facing surface, the attachment structure directly receiving the connecting member, the connecting member having a fluid passage connected to the fluid hose.

2. The disc brake caliper according to claim 1, wherein
the caliper main-body further includes a recess configured to arrange a piston such that the piston moves in a first direction, and
the facing surface is parallel to the first direction.

3. The disc brake caliper according to claim 2, wherein
the attachment structure includes an attachment hole provided on the facing surface, and
the connecting member is attached to the attachment hole.

4. The disc brake caliper according to claim 3, wherein
the attachment hole extends in a second direction perpendicular to the first direction.

5. The disc brake caliper according to claim 3, wherein
the caliper main-body further includes a mounting hole through which a mounting member is to extend in a state where the caliper main-body is mounted to the mounting portion of the bicycle frame via the mounting member, and
the attachment hole and the mounting hole extend in a second direction.

6. The disc brake caliper according to claim 5, wherein
the second direction is perpendicular to the first direction.

7. The disc brake caliper according to claim 2, wherein
the attachment structure is provided downstream of the piston in a positive rotational direction of a brake disc rotor in a state where the caliper main-body is mounted to the mounting portion of the bicycle frame.

8. The disc brake caliper according to claim 1, further comprising:
a base member configured to be arranged between the caliper main-body and the mounting portion of the bicycle frame and configured to be mounted to the mounting portion, wherein
the caliper main-body is configured to be coupled to the base member, and
the facing surface faces the mounting portion via the base member in a state where the caliper main-body is coupled to the base member.

9. The disc brake caliper according to claim 8, wherein
the base member includes a through-hole through which the connecting member is to extend in a state where the connecting member is attached to the attachment structure.

10. A disc brake caliper comprising:
a caliper main-body including:
a facing surface that faces a mounting surface of a mounting portion of a bicycle frame, the mounting surface being a surface to which the disc brake caliper is attached; and
an attachment structure that receives a connecting member connected to a fluid hose, the attachment structure being provided on the facing surface, the caliper main-body further including a recess configured to arrange a piston such that the piston moves in a first direction, the facing surface being parallel to the first direction, the connecting member comprising a banjo fitting bolt configured to be coupled to a banjo.

11. A bicycle disc brake caliper comprising:
a caliper main-body including:
a slit in which a brake disc rotor is to be arranged, the slit including an outlet opening from which the brake disc rotor is to exit in a positive rotational direction of the brake disc rotor;
a facing surface that faces in the positive rotational direction; and
an attachment structure that receives a connecting member connected to a fluid hose, the attachment structure being provided on the facing surface, the attachment structure directly receiving the connecting member, the connecting member having a fluid passage connected to the fluid hose.

12. A disc brake caliper comprising:
a caliper main-body including:
a facing surface configured to face a mounting portion of a bicycle frame;
a recess configured to arrange a piston such that the piston moves in a first direction; and
an attachment hole that receives a banjo fitting bolt having a fluid passage therein, the attachment hole extending in a second direction which is non-parallel to the first direction and which is perpendicular to the facing surface.

13. The disc brake caliper according to claim 12, wherein
the attachment hole is provided on the facing surface.

14. The disc brake caliper according to claim 13, wherein
the caliper main-body includes a mounting hole provided on the facing surface, and
the mounting hole extends in the second direction.

15. The disc brake caliper according to claim 14, wherein
the caliper main-body includes an additional mounting hole provided on the facing surface,
the additional mounting hole extends in the second direction, and
the attachment hole is provided between the mounting hole and the additional mounting hole.

16. A disc brake caliper comprising:
a caliper main-body including an attachment hole, and a caliper fluid passage extending from the attachment hole; and
a connecting member that connects to a fluid hose, the connecting member being attached to the attachment hole to directly couple the caliper main-body to one of a mounting portion of a bicycle frame and a base member that mounts the caliper main-body to the mounting portion, the attachment hole directly receiving the connecting member, the connecting member having a fluid passage connected to the fluid hose.

17. A disc brake caliper comprising:
a caliper main-body including an attachment hole, and a caliper fluid passage extending from the attachment hole; and
a connecting member that connects to a fluid hose, the connecting member being attached to the attachment hole to directly couple the caliper main-body to one of a mounting portion of a bicycle frame and a base member that mounts the caliper main-body to the mounting portion, the connecting member comprising a banjo fitting bolt including an intermediate fluid passage configured to connect a banjo fluid passage of a banjo to the caliper fluid passage.

18. The disc brake caliper according to claim 17, wherein
the caliper main-body further includes a facing surface configured to face the mounting portion of the bicycle frame, and
the attachment hole is provided on the facing surface.

19. A base member for mounting a caliper main-body to a mounting portion of a bicycle frame, comprising:
a body having a through-hole that receives a connecting member configured to be connected to a fluid hose and to be attached to the caliper main-body, the through-hole extending through a surface of the body, the surface facing the mounting portion of the bicycle frame such that the connecting member is between the surface and the bicycle frame; and
a cylindrical protrusion extending from the surface of the body and defining a part of the through-hole.

20. The base member according to claim 19, wherein
the body includes a first mounting hole and a first additional mounting hole spaced apart from the first mounting hole, and
the through-hole of the body is provided between the first mounting hole and the first additional mounting hole.

21. The base member according to claim 20, wherein
the body includes a second mounting hole provided between the first mounting hole and the first additional mounting hole.

22. The base member according to claim 21, wherein
the body includes a second additional mounting hole provided between the first mounting hole and the first additional mounting hole.

23. The base member according to claim 22, wherein
the through-hole of the body is provided between the second mounting hole and the second additional mounting hole.

24. A disc brake caliper comprising:
a caliper main-body including:
a facing surface configured to face a mounting portion of a bicycle frame to which the disc brake caliper is attached; and
an attachment structure to which a connecting member configured to be connected to a fluid hose is to be attached, the attachment structure being provided on the facing surface such that the connecting member is between the facing surface and the bicycle frame, the attachment structure directly receiving the connecting member, the connecting member having a fluid passage connected to the fluid hose.

* * * * *